3,175,937
METHOD OF BONDING METALS USING BOROSILICATE GLASSES
Joseph Bayer, Middletown, and William A. Patterson, Cincinnati, Ohio, assignors to Aeronca Manufacturing Corporation, Middletown, Ohio, a corporation of Ohio
No Drawing. Filed Feb. 26, 1960, Ser. No. 11,159
10 Claims. (Cl. 156—89)

This invention relates to a method of bonding or adhering metals, and more particularly, to an improved method of bonding component metal parts with inorganic adhesives of the ceramic, or "glass," type, to form integral structures therefrom.

The principal object of the present invention is the provision of a method of bonding metal components to form unitary structures which retain their strength at elevated temperatures at which structures formed by conventional bonding techniques would appreciably weaken.

The improvement effected by this invention is expected to be of the greatest utility in the fabrication of metal-to-metal composite panels for aircraft and missiles, although it is not limited to such structures alone. Because of its particular utility in the fabrication of steel honeycomb panels, the invention is hereinafter primarily described in relation thereto, but this is not intended as a limitation on the scope of the invention. For example, it is contemplated that the present method of bonding can also be used in the fabrication of heat exchangers, electric motor components, and the like.

The name "honeycomb" is derived from the core section of the composite panel which is of a honeycomb-like cellular construction. This core section is faced on either its top or bottom surfaces or both, by skin sheets. The resultant panel, which may be curved if desired, possesses a very high strength-to-weight ratio.

In the fabrication of honeycomb structures of the type described, certain problems attend the formation of the metal-to-metal bonds between the core section and skin sheet members. The metal strips forming the honeycomb core are thin and therefore present very limited surface area for bonding to the facing sheets; being thus localized, the bond must possess high strength per unit area. An important objective of this invention has been to provide a method for making metal-to-metal bonds of high strength, which bonds will retain their strength at elevated temperatures.

Heretofore, the standard practice in the fabrication of honeycomb panels made of steel has been to braze the core and skin sheets together, using a metal brazing compound. A serious problem inherent in this technique, however, is that in bonding the components, temperatures sufficiently high to melt the braze must be employed, which, in an air atmosphere, cause severe oxidation of the components. Inasmuch as the strips of which the honeycomb core is made are often no thicker than .001 inch, it is obvious that pitting or corrosion of such thin members quickly reduces their strength. Another object of this invention has been to provide a bonding technique in which oxidation of metal components is minimized or completely averted.

Recently, it has been found that inorganic glass compounds have considerable utility as adhesives in the bonding of honeycomb structures. It is with this type of bonding adhesive that the present invention is concerned.

While these ceramic adhesives may be of variant composition, they are all characterized by an amorphous structure and are, in effect, infinitely viscous. Consequently, they may be generically denoted as glasses. Chemically, they are mixtures of silicates, their composition being conveniently expressed in terms of percentages of oxides: $SiO_2$, $B_2O_3$, $Na_2O$, $K_2O$, and so on.

Although the exact mechanics of the process of bond formation with glass adhesives are not fully understood, it can be said in general that if a slip, or water slurry, made from a glass is spread on the metal surfaces to be bonded, and heat is applied in an oxidizing atomsphere to fuse the glass between the surfaces, upon solidification the glass forms an intimate bond with the metals, effectively uniting them.

In practice, the technique described is satisfactory only if the coefficient of expansion of the glass adhesive selected, that is, the rate at which the glass changes dimension with temperature change, is "compatible" with that of the metals being bonded. Specifically, the glass should have a coefficient of expansion which is not significantly greater than that of the metal to which it is applied. This condition of compatibility is important since the glass is fused onto the metal at high temperatures, for example, at about 1750° F. As the metal cools, the glass solidifies; if the metal has a coefficient of expansion smaller than that of the glass, it tends to contract more slowly than the glass which has become adhered to it as an incident of solidification, so that the glass is relatively put in tension. The glass, having little tensile strength, tends to crack, and may flake off from the metal surface. In any event, the bond is weak. To mitigate this circumstance, glasses are selected which have a coefficient of expansion less than, or not appreciably greater than, that of the metal. A glass so chosen contracts more slowly than the metal and when adhered to the metal, is relieved of stress, or is put in compression, which in fact improves the bond and removes the tendency to flake off. A number of different glasses have been developed meeting these conditions.

In the past, the glass-to-metal bonds so formed have not possessed the strength of the brazed bonds of the standard technique although they do have excellent resistance to temperature. The reason for this rests in the relatively brittle nature of the glass and in the comparatively weak adherence of the glass to the metal. A specific objective of the invention has been to provide glass adhesives which display improved adherence to metal as well as decreased brittleness.

The present invention is predicated upon the empirical discovery and determination that the bonding of structural metals with glass adhesives is greatly improved if ions of that or another structural metal are added to the glass, whereby a bond is obtained which displays excellent strength as well as resistance to elevated temperatures. Otherwise put, the adherence of a glass adhesive to a structural metal is greatly improved by mixing with the glass a compound which is capable of supplying ions of a structural metal to the glass. The invention is further predicated upon the discovery that the strength of ceramic bonds can also be improved by adding an oxidation resistant structural metal in powdered form to the glass adhesive.

For example, where steel components are to be bonded together, a glass having a coefficient of expansion less than that of steel is prepared, to which is added a quantity of an iron compound, preferably $Fe_2O_3$, which supplies ionic iron to the adhesive. A typical glass adhesive suitable for bonding steel components is of the following composition.

| | Percent or parts per 100 |
|---|---|
| $SiO_2$ | 38.0 |
| $Na_2O$ | 5.0 |
| $B_2O_3$ | 57.0 |

To a glass of this composition, iron oxide in the amount of about 2%, i.e., two parts per 100 parts of glass composition is added to achieve the improved bonding effect we have discovered. When applied in accordance with standard, known techniques, the adhesive so prepared provides stronger bonds than those previously obtained.

In general, the adherence of glass adhesives to any structural metal, for example, to nickel, nickel steel, or cobalt, is improved by the addition of ions of any structural metal to the glass. Where the metal is an alloy, ions of each of the several metals alloyed, or alternatively ions of the principal metals present in the alloy may be added to the adhesive. It is preferred that the metal ions be in the form of the metal oxide, for example, ferrous or ferric oxide, but other metal compounds may be employed provided they do not lose their utility through decomposition at fusion temperature, or in some independent way adversely affect the glass. Many metal compounds react to form the oxide at fusion temperatures; $Fe_2(CO_3)_3$ decomposes to form $Fe_2O_3$. For this reason, it is convenient to express the quantity of metal ions present in terms of the oxide, whether in fact the oxide actually is added. This convention is occasionally followed hereinafter.

Without intending to limit the invention, the following explanation is proposed to account for the improvement in adherence obtained by the addition of metal ions to the glass. There is apparently a strong affinity between a metal and its ions if the two are in very close contact. Such affinity is demonstrated by the adherence of aluminum oxide film to aluminum, and by the adherence of mill scale to steel. It is thought that the affinity is somewhat similar to the affinity between atoms within the metal itself. This affinity apparently also exists between the metal and ions of other structural metals. Thus, metal ions in the glass adhesive apparently tend to adhere to one another and to the metal as well, which accounts for the overall excellence the bond demonstrates.

The proportion of metal ions added to the glass is not hyper-critical, but an excess of ions may embrittle the glass, while an insufficient quantity may not result in the attainment of full bond strength. To avoid this, the quantity of ion, or oxide, added to the glass should be as great as possible without causing substantial embrittlement of the glass. In any given case this quantity must be determined empirically because it depends on the composition of the glass and the composition of the metal being bonded, and the nature of the ion-supplier added. For a glass of the composition described above, for example, about two parts by weight of iron oxide are used for one hundred dry parts of glass. The oxide can be added directly to the glass during compounding of the latter, or added to the prepared glass before application.

While a definite improvement in bond strength is obtained by the addition of metal ions to the glass, we have also discovered that the quality of the bond may be further improved by the addition of a very slowly oxidizable, or oxidation resistant, type of structural metal, in powdered form, to the glass prior to bonding. Thus, in bonding steel, the addition of stainless steel powder improves the bond; or, where the metal being bonded is itself oxidation resistant at fusion temperatures, it may be added as a powder to the glass. The addition of the powdered metal bonding surfaces within the glass adhesive itself, to which the metal ions adhere in a manner similar to their adherence to the bonded surfaces. It is important that the metal powder so added be only very slowly oxidizable since otherwise the high temperature of bonding would oxidize the metal and thereby both consume it and embrittle the glass by further addition of the metal oxide to it.

The addition of the oxidation resistant powder to the glass, apart from the addition of metal ions, of itself improves the bond since, at fusion temperatures, oxidation may take place on the surface of the bonded metal to provide a minor quantity of ions in the glass which adhere to the metal powder. However, the improvement is most vivid if both the metal ions and metal powder are specifically added to the glass.

Following is a detailed description of a preferred method of practicing the invention in the fabrication of a honeycomb panel made of 17–7 PH steel facing sheets and .002 inch 17–7 PH steel foil core:

A glass adhesive is compounded as follows:

| | Parts by weight |
|---|---|
| 400 mesh silica | 24.8 |
| $NaNO_3$, coarse granular | 9.0 |
| Boric acid | 66.2 |

The materials are thoroughly mixed in the proportions given. A smelting crucible is heated to approximately 2400° F. and about half the mixture is placed in it. The mixture is heated at about 2400° F. for about 20 minutes, until the frothing which occurs upon heating has nearly stopped. The rest of the glass mixture is then added to the crucible, and is again heated at 2400° to 2500° F. until all frothing has stopped and until a thread pulled from the glass melt contains no bubbles. This requires from about 20 to 60 minutes.

The melt is poured very slowly into a large bath of cold water to form a "frit." Preferably, the frit chips should be as small as possible. Water is removed from the chips, after which they are dried at about 250° F.

The frit is ball milled or otherwise comminuted until it will pass a 48 mesh screen. Typically this requires about eight hours. To one hundred parts of dry 48 mesh frit, two parts of $Fe_2O_3$ powders and 20 parts of 325 mesh 304 PC stainless steel powder are added. Water in the amount of 160 parts is added, and the combined mixture is milled or ground until it will pass a 200 mesh screen. This normally requires about three hours of milling. More water may be added as necessary to make a flowable material, or "slip." The slip thus formed is subject to agglomeration of hardening upon standing, and usually lasts for about three days. No slip should be used in the bonding process which shows any evidence of the formation of crystals.

While it has been specified that the iron oxide and stainless steel powder are added to the prepared frit, the oxide can alternatively be added to the components of the glass before smelting.

The facing sheets and honeycomb core are next prepared. After being cut to size and vapor degreased, these components are placed on a rack so that the supports touch only non-bonding surfaces. They are then placed in a furnace of about 1000° F. for about 30 minutes so that both the sheets and core become heat scaled. After cooling, the heat scale is loosened by placing the parts in a bath containing 20 percent concentrated $HNO_3$, 4 percent concentrated HF by volume for about five minutes at 150–160° F. This acid etch treatment should be discontinued as soon as the scale is loosened, and the core should not be left in the bath for more than five minutes under any circumstances. The parts are then cold water rinsed and the scale removed, after which they are transferred to a bath containing 0.16 ounce of borax per gallon and 0.48 ounce of soda ash per gallon, for thirty minutes at about 125° F. After cold water rinsing and air drying, the skins and cores are ready for the adhesive.

The inorganic adhesive prepared in the manner described is sprayed onto the bonding sides of the skin sheets to a thickness of approximately .004 inch. The proper technique of spraying is largely empirical. A slip that is glossy when sprayed is too wet and one which is grainy is too dry. A correctly applied slip forms a bisque which does not crack or powder.

The sheets are heated to about 200° F., preferably under heat lamps, for about ten minutes to dry the bisque. Temperature should not exceed 212° F. This spraying and drying procedure is repeated until a dry bisque about .013 inch thick has been applied. If the initial weight of the sheets is known, the thickness of the bisque may be determined by the weight of the coated sheets; the dried bisque should weigh about 0.25 gram per square inch. The sheets are placed horizontally in a furnace at 1750° F. for about eight minutes.

A coat of adhesive is evenly applied to all sides of the core. The adhesive is dried at 200° F. for ten minutes and then at 250° F. for ten more minutes. The opposite side of the core is sprayed in like manner, and the process is repeated until the pick up of adhesive is about 2.5 grams per square inch of core. The proper weight of adhesive to be applied depends on the thickness of the core and the size of the cells in it; the weight given is for a core one-half inch thick having one-fourth inch cells. The core is then heated at 1750° in vertical position for four minutes. The coating of glass over the entire structure protects the surfaces from corrosion at this temperature, so that heating may be carried out in an air atmosphere.

The honeycomb "sandwich" is preferably assembled in a standard ceramic adhesive bonding vacuum pressure tool. As is well known to those skilled in the art, this tool is essentially a shallow pan having a flange edge and a flat top closure, in which the sandwich to be bonded is enclosed and held under vacuum. Normal atmospheric pressure on the outside of the evacuated tool, which is sealed air tightly, exerts pressure on its top and bottom surfaces which presses the components of the sandwich into tight engagement with each other.

Inside the bottom pan of the tool is placed a refractory ceramic member. The configuration or curvature of the surface of this member determines the shape of the assembled honeycomb; if this member and its corresponding top member are curved, then the honeycomb is given a curved shape when pressed between them. On top of the ceramic forming member is placed an insulating sheet which may be of ceramic fibers, over which is placed a metal sheet to permit the honeycomb panel pieces to slide slightly as they expand and contract with temperature change during bonding. The assembled honeycomb is then placed on top of this slip sheet in the pan, and on top of it is placed another slip sheet, insulating ceramic sheet, and the top ceramic forming member. The lid of the tool is positioned on the pan and welded to the flange so that the resultant structure is air tight. Through an air outlet the pressure inside the seal pan is reduced to negative 5 p.s.i. With this pressure maintained, the tool is rapidly heated to 1750° and maintained at the fusion temperature for about ten minutes. During this heating, the glass fuses and bonds the elements to form an integral structure. After this, it is cooled to 200° F. at a negative pressure of seven pounds. The sandwich is then removed, cooled to —100° F., and held at that temperature for eight hours, and finally is aged at 950° F. for sixty minutes to properly temper the steel.

In the foregoing example, certain of the individual techniques of surface preparation, bonding and the like, are old and are not part of this invention, as will be understood to those familiar with the subject matter. Insofar as the adhesive is concerned, ceramic adhesives of other compositions are suitable. It is also possible to use iron compounds other than ferric oxide to supply ions, as well as compounds of other structural metals, without departing from the principle of the invention. In place of the stainless steel powder, other oxidation resistant structural metal materials in powdered form can be used.

Having described our invention, we claim:

1. The method of bonding steel components together to form an integral structure therefrom, said method comprising, preparing a ceramic composition having the approximate analysis 38.0 parts $SiO_2$, 5.0 parts $Na_2O$, 57.0 parts $B_2O_3$, the parts of $SiO_2$, $Na_2O$ and $B_2O_3$ totalling 100 parts, and about 2 parts $Fe_2O_3$ per 100 parts $SiO_2$, $Na_2O$ and $B_2O_3$, making a slip of said ceramic composition, coating said components individually with said slip, heating said components in unassembled relation to fuse said composition thereon, cooling said components to solidify the fused composition, applying heat and pressure to said components in assembled relation to refuse said composition, and cooling the assembled components under pressure, whereby said components are adhered by said ceramic composition, the resulting structure being adapted to withstand temperature changes of several hundred degrees in use.

2. The method of claim 1 wherein up to about 20 parts stainless steel powder per 100 parts of $SiO_2$, $Na_2O$, and $B_2O_3$ are included in said composition.

3. The method of claim 2 wherein the first mentioned fusing step is done in an air atmosphere.

4. The method of bonding steel components together to form an integral structure therefrom, said method comprising, preparing a ceramic adhesive having the approximate composition, 38.0 parts per hundred $SiO_2$, 5.0 parts per hundred $Na_2O$, 57.0 parts $B_2O_3$, about 2 parts $Fe_2O_3$, and about 20 parts stainless steel powder, said parts of $Fe_2O_3$ and stainless steel powder comprising additions to each 100 total parts of said $SiO_2$, $Na_2O$ and $B_2O_3$, making a slip of said adhesive, coating said components individually with said slip and drying said slip thereon, applying heat and pressure to said components in assembled relation to fuse said adhesive, and cooling the assembled components under pressure, whereby said ceramic adhesive bonds said components together, said adhesive maintaining the bonding of said components through temperature changes of several hundred degrees.

5. The method of claim 4 wherein said integral structure is a steel honeycomb panel.

6. The method of claim 5 wherein said steel components are fabricated of type 17–7 PH steel.

7. The method of bonding steel honeycomb panel components together to form an integral panel therefrom, said method comprising, compounding a glass adhesive having the composition, 24.8 parts by weight silica, 9.0 parts $NaNO_3$, 66.2 parts boric acid, 2 parts $Fe_2O_3$ powder, and 20 parts stainless steel powder, making a slip from the resultant mixture, cleaning said panel components, spraying said slip onto said components individually, drying said slip thereon, heating said components in an air atmosphere prior to assembly to fuse said adhesive thereon, cooling said components to solidify said fused adhesive thereon, applying heat and pressure to said components in assembled relation in a vacuum to refuse said adhesive, and cooling the adhered, assembled components.

8. The method of claim 7 wherein the first mentioned fusing takes place at a temperature of about 1750° F.

9. The method of claim 7 wherein the second mentioned fusing takes place at about 1750° F. for about 10 minutes.

10. The method of claim 7 wherein said stainless steel powder is 325 mesh 304 PC powder.

(References on following page)

References Cited by the Examiner

UNITED STATES PATENTS

| | | | |
|---|---|---|---|
| 1,249,937 | 12/17 | Eyer | 106—48 |
| 2,012,552 | 8/35 | Taylor | 106—54 |
| 2,109,641 | 3/38 | Hood | 106—54 |
| 2,403,079 | 7/46 | Higgins | 154—129 |
| 2,647,070 | 7/53 | Litton | 154—129 |
| 2,679,568 | 5/54 | Smith et al. | 154—2.4 |
| 2,771,969 | 11/56 | Brownlow | 106—53 X |
| 2,786,782 | 3/57 | Zimmerman et al. | 106—48 |
| 2,857,664 | 10/58 | Luks et al. | 29—473.1 |
| 3,080,328 | 3/63 | Billian | 252—513 |

OTHER REFERENCES

Gooding et al.: "A Study of the Series of Glasses Containing Sodium Oxide, Boric Oxide and Silica," published in Journal of the Society of Glass Technology, vol. 18, pp. 32–66 (1934), Table II on page 39 and pages 46–66 cited.

ALEXANDER WYMAN, *Primary Examiner.*

EARL M. BERGERT, JOSEPH REBOLD, CARL F. KRAFFT, *Examiners.*